(12) United States Patent
van Beek et al.

(10) Patent No.: US 10,443,753 B2
(45) Date of Patent: Oct. 15, 2019

(54) SHAPE MEMORY ALLOY ACTUATOR FOR VALVE FOR A VAPOUR COMPRESSION SYSTEM

(71) Applicant: Danfoss A/S, Nordborg (DK)

(72) Inventors: Johan van Beek, Almind (DK); Michael Birkelund, Middelfart (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 14/760,852

(22) PCT Filed: Jan. 15, 2014

(86) PCT No.: PCT/EP2014/050653
§ 371 (c)(1),
(2) Date: Jul. 14, 2015

(87) PCT Pub. No.: WO2014/111397
PCT Pub. Date: Jul. 24, 2014

(65) Prior Publication Data
US 2015/0354719 A1    Dec. 10, 2015

(30) Foreign Application Priority Data

Jan. 17, 2013 (EP) .................................... 13151650

(51) Int. Cl.
| | |
|---|---|
| *F16K 31/00* | (2006.01) |
| *F16K 31/02* | (2006.01) |
| *F25B 41/06* | (2006.01) |

(52) U.S. Cl.
CPC .......... *F16K 31/002* (2013.01); *F16K 31/025* (2013.01); *F25B 41/062* (2013.01)

(58) Field of Classification Search
CPC .... F16K 31/002; F16K 31/025; F25B 41/062; F03G 7/065

(Continued)

(56) References Cited

U.S. PATENT DOCUMENTS

| | | | |
|---|---|---|---|
| 3,613,732 A | 10/1971 | Willson et al. | |
| 4,750,520 A * | 6/1988 | Heim ........................ | F15C 5/00 137/625.33 |

(Continued)

FOREIGN PATENT DOCUMENTS

| | | |
|---|---|---|
| CN | 1182848 A | 5/1998 |
| CN | 1721614 A | 1/2006 |

(Continued)

OTHER PUBLICATIONS

International Search Report for Serial No. PCT/EP2014/050653 dated Mar. 7, 2014.

(Continued)

*Primary Examiner* — Mary E McManmon
*Assistant Examiner* — Andrew J Rost
(74) *Attorney, Agent, or Firm* — McCormick, Paulding & Huber LLP (57) ABSTRACT

The invention relates to an actuator for a valve in a refrigeration system. The invention also relates to a valve with such actuator, and to a refrigeration system with such valve. The actuator comprises an elongated Shape Memory Alloy (SMA) element extending along two or more string-like extensions from a distant end to a proximate end in relation to a valve element of a valve. The SMA element, when forming part of the valve, may extend from the distant end to the proximate end connected to a housing of the SMA element, however, electrically insulated from the housing. An encapsulation may provide a thermal resistance, a thermal conductor and/or an electrical resistance between the SMA element and other elements or the surroundings of the SMA element.

23 Claims, 4 Drawing Sheets (58) Field of Classification Search
USPC .......................................................... 251/11
See application file for complete search history.

(56) References Cited

U.S. PATENT DOCUMENTS

| | | | |
|---|---|---|---|
| 4,973,024 A | 11/1990 | Homma | |
| 5,033,713 A * | 7/1991 | Thorsen | F03G 7/065 251/11 |
| 5,211,371 A * | 5/1993 | Coffee | F16K 31/002 251/11 |
| 5,345,963 A | 9/1994 | Dietiker | |
| 5,865,418 A * | 2/1999 | Nakayama | G05D 23/026 251/11 |
| 6,742,761 B2 * | 6/2004 | Johnson | F16K 31/566 251/11 |
| 6,843,465 B1 * | 1/2005 | Scott | F16K 31/025 251/129.06 |
| 7,073,332 B2 * | 7/2006 | Butera | E05B 47/0009 403/28 |
| 7,585,006 B2 * | 9/2009 | Alacqua | A47L 15/4259 292/244 |
| 7,815,161 B2 * | 10/2010 | Saitoh | F16K 31/025 251/11 |
| 2002/0171055 A1 | 11/2002 | Johnson et al. | |
| 2003/0198558 A1 | 10/2003 | Nason et al. | |
| 2009/0302708 A1 * | 12/2009 | Takahashi | F03G 7/065 310/306 |

FOREIGN PATENT DOCUMENTS

| | | |
|---|---|---|
| DE | 19934827 C1 | 5/2001 |
| EP | 0 841 510 A1 | 5/1998 |
| EP | 1 548 342 A1 | 6/2005 |
| EP | 2946108 B1 | 3/2017 |
| JP | 51019368 A | 1/1986 |
| JP | 108320171 A | 12/1996 |
| JP | 2007024486 A | 2/2007 |
| JP | 2009250590 A | 10/2009 |
| WO | 9502143 A1 | 5/1994 |
| WO | 2010132997 A1 | 11/2010 |
| WO | 2010/142997 A1 | 12/2010 |
| WO | 2012106415 A1 | 8/2012 |

OTHER PUBLICATIONS

Article Entitled "Fabrication of Nitinol Materials and Components" by Wu. Ming H. Memry Corporation, Bethel, CT (8 pages).
International Search Report for Serial No. PCT/EP2016/073432 dated Jan. 2, 2017.

* cited by examiner

SHAPE MEMORY ALLOY ACTUATOR FOR VALVE FOR A VAPOUR COMPRESSION SYSTEM

CROSS-REFERENCE TO RELATED APPLICATION

This application is entitled to the benefit of and incorporates by reference subject matter disclosed in the International Patent Application No. PCT/EP2014/050653 filed on Jan. 15, 2014 and European Patent Application 13151650.2 filed Jan. 17, 2013.

TECHNICAL FIELD

The invention relates to an actuator for a valve for a refrigeration system. The invention also relates to a valve for a vapour compression system such as a valve for a refrigeration system or a heat pump system and the invention also relates to such a vapour compression system, preferably to a refrigeration system.

BACKGROUND

Valves for vapour compression systems such as refrigeration systems or heat pump systems are known in different structures and for different uses within the refrigeration system. Mostly, valves of refrigeration systems are thermostatically or electro-mechanically operated, depending on use within the refrigeration system. Shape Memory Alloy (SMA) material has also been used for operating a valve.

WO 2010/142997 discloses a valve comprising a body, a passageway, a sealing member, a trigger, and a temperature responsive trigger actuator. The temperature responsive trigger actuator includes a plurality of point trigger actuator portions wherein each one of the plurality of point trigger actuator portions is characterized by a respective shape-changing temperature and is configured such that, for each one of the plurality of point trigger actuator portions, when the temperature of the point trigger actuator portion is below the respective shape-changing temperature, the point trigger actuator portion is disposed in a respective low temperature shape condition, and when the temperature of the point trigger actuator portion is at or above the respective shape-changing temperature, the point trigger actuator portion is disposed in a respective high temperature shape condition. WO 2010/142997 uses one wire strip extending from a position distant from the sealing member, into the body to a position proximate the sealing member, using a force from the one wire strip for triggering the sealing member and using part of the valve body for conducting electrical current to the trigger actuator.

U.S. Pat. No. 5,345,963 discloses an electrically controlled modulating pressure regulator in which a main valve regulates fluid flow between an inlet and an outlet in response to a control pressure produced by a servo valve which is responsive to the outlet pressure and the force applied by a regulator spring to a diaphragm carrying the servo valve closure element. Deformation of the regulator spring can be varied by an electrical actuator in the form of a wire segment of a shape memory alloy through which electric current can be passed to vary its temperature and length. An adjustable spring retainer electrically controlled by an actuator including a wire segment of a shape memory alloy material. Ends of wire segment are fixed with respect to a housing. Either the wire segment passes over the end of a push rod assembly, which extends between the intermediate location on the wire segment and spring retainer 43, or a compression spring is positioned between a first spring retainer on the top side of a diaphragm and a second spring retainer, whose position can be electrically varied by means of actuator comprising a wire segment of a shape memory alloy material regulator compression spring 101. The wire segment operates a valve element in a manner, so that the wire segment itself is out of contact with the fluid flow passing through the pressure regulator.

US 2002/171055 discloses an SMA actuated miniature latching valve for on and off control of fluid flow. A valve closure includes a poppet for opening and closing the fluid flow path. The poppet is operated responsive to an actuator mechanism which has SMA wires arranged to be actuated by electric resistant heating. Actuation causes different ones of the wires to contract and pull the poppet either toward or away from a valve seat. A latching mechanism comprising a conical spring operates between two bistable positions which hold the poppet either fully open or fully closed without further application of power to the actuators. First actuator 50 is comprised of a pair of shape memory alloy wires. The two wires are mounted at their upper ends to a bracket which is attached to the upper end of a mid-housing. The lower ends of these two wires are attached to a drive bar which is attached to the lower end of an elongate tubular pintle sleeve which fits about a pintle. The two SMA wires are actuated by being heating through their phase change transition temperatures so that they revert to their memory shapes. This causes them to contract in length so that they act in unison to exert an upward pulling force on the pintle sleeve, causing the pintle to slide up. The pintle in turn moves a poppet up to the valve open position. SMA wires operate a pintle, so that he wires themselves are out of contact with the fluid flow passing through the pressure regulator.

It may be an object of the present invention to provide an actuator making use of Shape Memory Alloy, and which actuator may function in a valve for a vapour compression system, even if high pressure differences are present in the valve body and even if the Shape Memory Alloy is passing fully or partly through part of the valve, where also a fluid is passing through the valve or if the actuator of the valve is surrounded fully or partly by an environment having a certain temperature not suited for Shape Memory Alloy. It may also be an object to provide a valve, where there is an easy way of providing a normally open or normally closed position. Furthermore, it may be an object of the invention to provide a valve for a refrigeration system or a heat pump system, where Shape Memory Alloy properties are maintained, when refrigerant is flowing through the valve.

SUMMARY

One or more of the objects are obtained by an actuator, where the actuator comprises an elongated Shape Memory Alloy element, said Shape Memory Alloy element, when forming part of the valve, having one end intended for being distant to a valve element of the valve, and a second end intended for being proximate to the valve element, and where the Shape Memory Alloy element extends from the distant end to the proximate end along at least two, preferably parallel, extensions of the Shape Memory Alloy element, and where said actuator comprises an encapsulation constituting an elongated body for the elongated Shape Memory Alloy element, and where the encapsulation encapsulates the at least two extensions of the Shape Memory Alloy element, and where the encapsulation provides a thermal resistance between a temperature of the Shape Memory Alloy element and a temperature of an environment of the encapsulation and of the at least two extensions of the Shape Memory Alloy element.

Extension of the Shape Memory Ally element along two extensions results in an increased force provided by The Shape Memory Alloy element. Furthermore, two extensions may also provide the possibility of extensions of Shape Memory Alloy being of a smaller dimension, thereby reducing energy consumption of the actuator.

By providing an encapsulation with a certain thermal resistance, the thermo-mechanical properties of the Shape Memory Alloy element may be maintained and/or may be calibrated, non-dependent on, or at least only dependent of a minor level, of any temperature of a refrigerant or of ambient air in the immediate vicinity of the Shape Memory Alloy element. The thermal resistance of the encapsulation obstruct fully or partly heat or cold from the surroundings to pass to the Shape Memory Alloy element. The thermal resistance of the encapsulation may alternatively, or additionally, allow heat from the Shape Memory Alloy element to pass to the surroundings. The encapsulation may also provide a mechanical barrier.

In one embodiment of an actuator according to the invention, the encapsulation extends from the distant end to the proximate end, encapsulating the strings of the Shape Memory Alloy element along the entire distance from the distant end to the proximate end, and where the strings of the Shape Memory Alloy element are capable of displacing within the encapsulation, at least between the distant end and the proximate end.

The Shape Memory Alloy element displacing inside the encapsulation ensures free and non-obstructed displacement of the Shape Memory Alloy element, while at the same time ensuring that the thermal properties and the force provided by the Shape Memory Alloy, when displacing, are as little as possible influenced by temperatures of the environment, e.g., a temperature of a refrigerant passing the encapsulation or a temperature of cold store air surrounding the encapsulation.

Possibly, the encapsulation constitutes a cover having one of the following structures: a plurality of pipes or tubes or rods, each having an elongated internal cavity for accommodating one of the strings; or one pipe or one tube or one rod having a plurality of elongated internal cavities for accommodating one of the strings in each of the plurality of elongated internal cavities.

Encapsulation with internal cavities ensures close relationship between the Shape Memory Alloy element and the encapsulation, however, still allowing the strings of the Shape Memory Alloy element to displace inside the cavities.

In another embodiment of an actuator according to the invention, the encapsulation extends from the distant end to the proximate end, encapsulating the strings of the Shape Memory Alloy element along the entire distance from the distant end to the proximate end, and where the encapsulation is capable of displacing together with the elongated Shape Memory Alloy element, at least between the distant end and the proximate end.

The encapsulation displacing along with the Shape Memory Alloy element provides a possibility of pre-coating or pre-covering the Shape Memory Alloy element with any material or structure suited for providing a thermal encapsulation, depending on the temperature of the environment and depending on any gas or liquid passing the Shape Memory Alloy element or surrounding the Shape Memory Alloy element.

Possibly, the encapsulation constitutes a coating provided at an outside surface of each of the strings, said coating being made of a material having an elastic module making the encapsulation capable of elastically displacing more than a possible maximum displacement of each of the strings.

Encapsulation made of a material having a sufficiently high elastic modulus ensures that the coating provided on the strings of the Shape Memory Alloy element will not disintegrate, when the strings of the Shape Memory Alloy element are displaced.

According to one aspect of the actuator according to the invention, the actuator comprises an elongated Shape Memory Alloy element, said Shape Memory Alloy element, when forming part of the valve, having one end intended for being distant to a valve element of the valve, and a second end intended for being proximate to the valve element, and where the Shape Memory Alloy element extends from the distant end to the proximate end, where the Shape Memory Alloy element is connected to a housing of the Shape Memory Alloy element at the distant end, electrically insulated from the housing, and where the Shape Memory Alloy element extends between the distant end and the proximate end, electrically insulated from the housing. The Shape Memory Alloy element being electrically insulated from the housing results in the thermo-mechanical properties of the Shape Memory Alloy element not being influenced by any electrical, thermal or mechanical properties of other parts of the valve. The Shape Memory Alloy element primarily operates according to the specific properties of the element itself.

According to another aspect of the actuator according to the invention, the Shape Memory Alloy element is shaped as a plurality of straight strings, with at least a first string and a second string extending, preferably parallel, from the distant end to the proximate end, or vice versa. Shaping the Shape Memory Alloy element as strings has the advantage of providing a shape being non-expensive to manufacture, and a shape having a direct and being easy to calibrate at different electric currents.

According to a possible embodiment of an actuator according to the invention, the Shape Memory Alloy element is made in single piece, with an intermediate section connecting the at least one first extension and the at least one second extension, said intermediate section of the Shape Memory Alloy element, when forming part of the valve, is connected to the valve element. Making the Shape Memory Alloy element in one piece, although comprising at least two individual extensions, has the advantage of providing an element being integrate, having no internal mechanical connections, and having same structural and thermo-mechanical properties along the entire extension of the element.

A valve according to the invention comprises a valve body with at least one inlet and at least one outlet for a refrigerant, and with a valve element positioned inside the valve body and having an actuator according to any of the aspects mentioned above, that is, a valve characterized in said actuator extending between the at least one inlet and the at least one outlet of the valve body, said valve furthermore comprising an encapsulation for the first string and the second string of the Shape Memory Alloy element towards surroundings of the first string and the second string. The valve according to the invention has the same advantages for operating and for displacing the valve element as mentioned as possible advantages of the actuator according to the invention, that is, possibility of placing the valve and the actuator of the valve in an environment having a temperature, which it is intended to shield the Shape Memory Alloy element from by use of the encapsulation.

According to a preferred embodiment of the invention, the valve has an actuator comprising a plurality of straight strings made in single piece, with at least a first section of the single piece extending from a distant end to a proximate end, and with at least a second section of the single piece extending from the proximate end to the distal end, and where, at the proximate end, the single piece is attached to the valve element by an intermediate section of the single piece of strings and extending embedded in the valve element along a curve, so that a second string of the single piece extends out from the valve element in a direction being substantially opposite to a direction that the first string extends into the valve element. An intermediate section of a string, where said intermediate section is embedded in the valve element, provides a reliable and simple connection between the Shape Memory Alloy element of the actuator and the valve element of the valve, with no additional mechanical bonding means as such.

According to an aspect of the valve according to the invention, the actuator has an extension where at least 50% of the extension, preferably at least 60% of the extension, possibly at least 75%, even possibly between 75% and 100% of the Shape Memory Alloy element extends outside the valve body. The Shape Memory Alloy having a major part extending outside the valve body ensures that at least only a minor part can be exposed to refrigerant flowing through the valve body, thereby avoiding cooling the Shape Memory Alloy element and thus impeding the thermo-mechanical properties of the element.

In a possible embodiment, the actuator has an extension where all of the extension of the Shape Memory Alloy element extends inside the valve body, and where a flow of refrigerant is capable of passing the extension of the actuator. The actuator extending inside the valve body may have the advantage that the actuator does not take up additional space than that of the valve body, thereby minimizing the size of the valve.

BRIEF DESCRIPTION OF THE DRAWINGS

The invention will hereafter be described with reference to the drawing, where.

DETAILED DESCRIPTION

Figure 1:
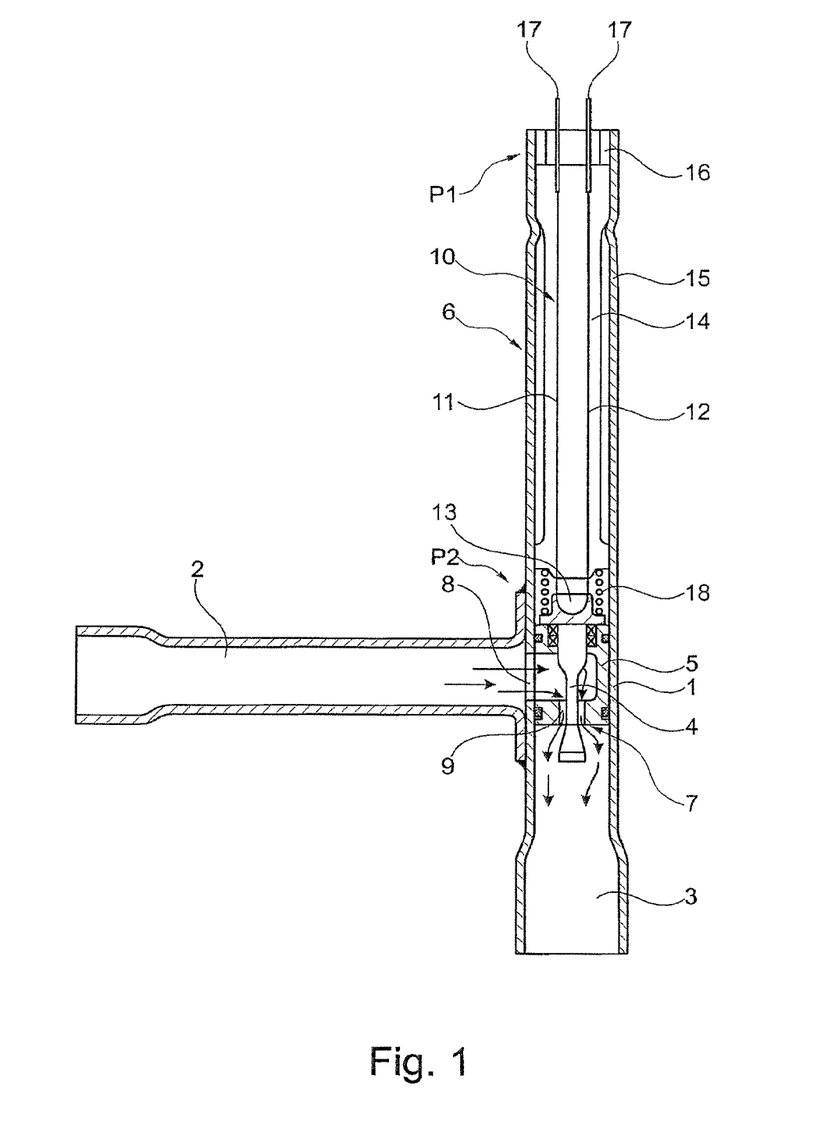
FIG. 1 is a first possible embodiment of a valve according to the invention.

FIG. 1 shows a first embodiment of a valve comprising a valve body 1, a valve inlet 2 and a valve outlet 3. The valve furthermore comprises a valve element 4 and a valve seat element 5 and an actuator 6 for operating the valve element 4 in relation to the valve seat element 5.

The valve seat element 5 is fixed inside the valve body 1. The valve seat element 5 has a valve seat 7, a valve seat inlet 8 and a valve seat outlet 9. The valve element 4 is capable of allowing or obstruction flow of refrigerant through the valve 1 and the valve seat element 5 by the valve element 4 being displaced in relation to the valve seat 7. In the shown position of the valve element 4 in relation to the valve seat 7, flow of refrigerant through the valve is allowed, and the valve element 4 is in a fully open position. The valve element 4 is diverging from the valve seat 7 and further along the extension of the valve element 4. A diverging valve element reduces the pressure of the refrigerant after having passed the valve seat. Reduction of the pressure reduces the risk of recirculation of the refrigerant and reduces the risk bubbles forming in the refrigerant. Reduction of the risk of bubbles forming reduces any noise, which may occur and may be disturbing, when the refrigerant passes the valve.

The actuator 6 comprises an elongated Shape Memory Alloy element 10 made of Shape Memory Alloy material, said element controlling a position of the valve element 4. In the remainder of the detailed description, Shape Memory Alloy element will be denoted SMA element and Shape Memory Alloy material will be denoted SMA material. An SMA element made of an SMA material, mostly a metal, is an element that "remembers" the original shape. The original shape of the SMA element is the shape, when not being subject to any combination of mechanical, thermal and/or electrical impact. The SMA material is possibly a nickel-titanium alloy. Other SMAs include copper-aluminum-nickel, copper-zinc-aluminum, and iron-manganese-silicon alloys.

The SMA element 10, in the embodiment shown in FIG. 1, comprises a first string 11 and a second string 12 extending in parallel. Both the first string 11 and the second string 12 extend from a distant end position P1, said distant end being distant from the valve element 4, and to a proximate end position P2, said proximate end being proximate to the valve element 4. The valve element 4 is made of a material, which is electrically insulating the SMA element 10 from other elements and parts of the valve.

The SMA element 10, in the embodiment shown in FIG. 1, is constituted by a single piece consisting of the first string 11, the second string 12 and an intermediate string 13 between the first string 11 and the second string 12. The first string 11 extends from the distant end P1 to proximate end P2 at the valve element 4, at which proximate end P2 the first string enters the valve element 4. Along the intermediate string 13 of the SMA element 10, between the first string 11 and the second string 12, the SMA element 10 is embedded in the valve element 4. The extension of the SMA element 10 changes direction from where the SMA element 10 enters the valve element 4 to where the SMA element 10 exits the valve element 12. The SMA element 10 exits the valve element 4 in a direction opposite to the direction of the SMA element 10, where the SMA element 10 enters the valve element 4. In the embodiment shown in FIG. 1, the SMA element 10 changes direction by 180 degrees, so that the first string 11 is parallel with the second string 12. Alternatively, the first string and the second string may form a mutual angle of up to 90 degrees and any other mutual angle between 90 degrees and 0 degrees, that is, any mutual angle between 90 degrees and parallel as shown in FIG. 1.

An encapsulation 14 is provided, in which the first string 11 and the second string 12 of the SMA element 10 are embedded. Although being embedded in the encapsulation 14, the first string 11 and the second string 12 are capable of displacing within the encapsulation 14. The first string 11 and the second string 12 being capable of displacing within the encapsulation 14 is obtained by the encapsulation constituting a cover being one pipe or one tube or one rod having a number of elongated internal cavities (not shown) for accommodating one of the strings 11, 12 inside the elongated internal cavities. Alternatively, the encapsulation 14 constitutes a cover being a plurality of pipes or tubes or rods, each pipe or tube or rod having an elongated internal cavity (not shown) for accommodating one of the strings 11,12.

In an alternative embodiment, the encapsulation, in which the first string 11 and the second string 12 of the SMA element 10 are extending, is a coating or a cover provided on an outside surface of the first string 11 and the second string 12 of the SMA element 10. If the encapsulation is a coating or a cover on the outside surface of the first string 11 and the second string, the encapsulation is capable of displacing along with a displacement of the first string 11 and the second string 12.

If the encapsulation is a coating or a cover on the outside surface of the first string 11 and the second string 12, the coating or cover is made of a material having a thermal conductivity lower than a thermal conductivity of the SMA material. Possibly, a coating may be made of Polytetrafluoroethylene (PFTE).

The encapsulation 14 provides at least one of the following properties: a thermal resistance between the SMA element and the surroundings of the encapsulation, a thermal conductor between the SMA element and the surroundings of the encapsulation, an electrical resistance between the SMA element and elements of the valve surrounding the SMA element, an electrical resistance between a plurality of extensions of the SMA element.

A pipe 15, in which the encapsulation 14 extends, constitutes a cover for the encapsulation 14, and also constitutes a rigid element between the valve seat element 5 and the distant end P1 of the SMA element 10. The pipe 15 forms an integrate part of the valve body 1, but the pipe 15 is not part of the valve body 1 as such. The valve body comprises only the part of the valve enclosing the valve element 4 and the valve seat element 5. In the embodiment shown in FIG. 1, the valve body 1, the valve outlet 3 and the pipe 15 is the one and same element. The valve inlet 2 is a separate element fixed to the valve body 1. In alternative embodiments, see FIG. 2 and FIG. 3, also the valve inlet 2 is integrated with the valve body 1.

A stop 16 is provided at the distant end P1 of the SMA element 10, also being a distant end of the encapsulation 14 and of the pipe 15. The stop 16 comprises two pins 17 constituting electrical connectors for the first string 11 and the second string 12 of the SMA element 10. A plug (not shown) of an electrical current supply (not shown) for providing electrical current to the SMA element 10 is intended for engaging with the pins 17 for applying electrical current to the SMA element 10. The stop 16 is fixed to the distant end P1 of the pipe 15 and constitutes a stop for the encapsulation 14 and also constitutes a placeholder for the pins 17.

An elastic element 18, preferably a helical spring, is provided inside the pipe 15, between the encapsulation 14 and the valve element 4. The elastic element 18 forces the valve element 4 towards the valve seat element 5. In the embodiment shown in FIG. 1, when the valve element 4 is forced towards the valve seat element 5, the valve element 4 is in a fully open position in relation to the valve set 7. When the valve is to be less open than fully open, the force from the elastic element 18 is counteracted by an oppositely directed force from the SMA element 10, when an electric current is applied to the SMA element 10.

The valve seat element 5 of the embodiment shown in FIG. 1 is fixed to the valve body 1 in such a manner, that refrigerant flowing through the valve does not come into direct contact with the SMA element 10. Thereby, the SMA element 10 will not be directly cooled by the refrigerant, and the intended properties of the SMA element is maintained unaffected by the refrigerant. The intended properties of the SMA element is heating of the SMA element, when electric current is applied to the SMA element, and the heating of the SMA element resulting in the SMA element changing shape. Changing shape of the SMA element will be an extension of a length of the first string 11 and the second string 12.

Figure 2:
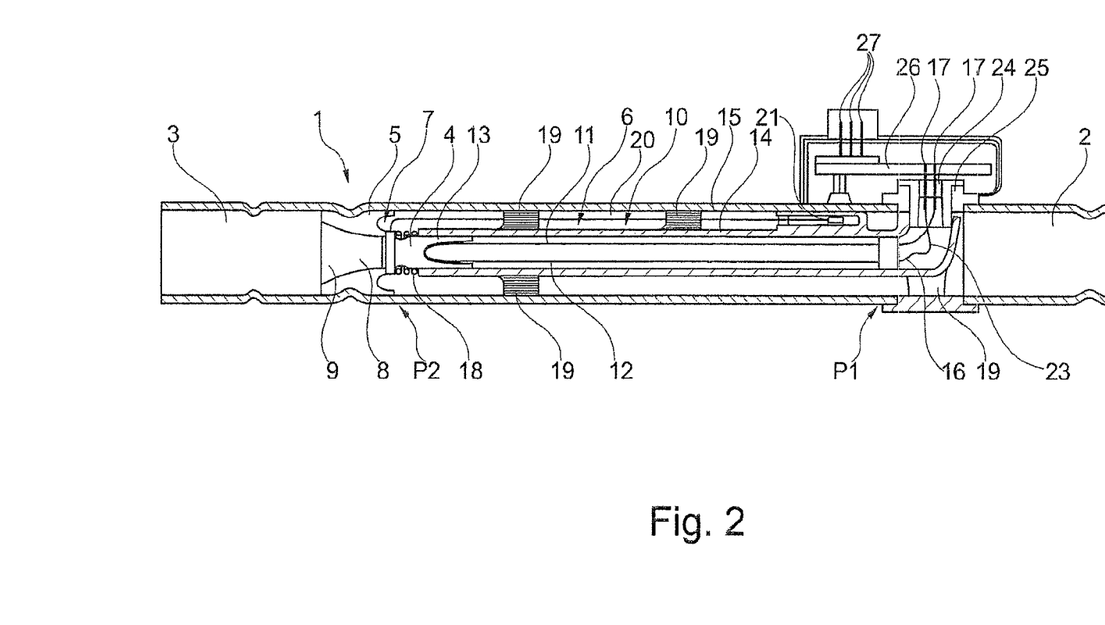
FIG. 2 is a second possible embodiment of a valve according to the invention.

FIG. 2 shows a second embodiment of a valve comprising a valve body 1, a valve inlet 2 and a valve outlet 3. The valve furthermore comprises a valve element 4 and a valve seat element 5 and an actuator 6 for operating the valve element 4 in relation to the valve seat element 5. The valve shown in FIG. 2 may in general be described as an in-line valve for a refrigeration system, where the valve is emended in the piping of the refrigeration system. The result is that the valve constitutes an integrate part of the piping ad such for passing refrigerant from one part of the refrigeration system to another part of the refrigeration system, apart from the part constituted by the valve.

Advantages of an in-line valve as shown in FIG. 2 and in general are the following: Providing a bi-flow valve, that is, a valve where refrigerant may flow in both direction, not only from the inlet to the outlet as shown in FIG. 2, but also reverse, from the outlet to the inlet as shown in FIG. 2, is readily capable of being established. In combination with a so-called balanced port, that is, the valve element and the valve seat being shaped so that the pressure difference between the inlet and the outlet as shown in FIG. 2, or vice versa, between the outlet and the inlet as shown in FIG. 2, is balanced, the capability of providing a bi-flow valve is possible, when providing the valve according to the invention as in in-line valve, as example an in-line valve as shown in FIG. 2.

Another advantage of providing a valve as an in-line valve is that material used is limited along the extension of the piping, where the valve is provided. In known refrigeration or air conditioning systems, extension of the piping may increase along the extension, where any one or more valves are provided. By providing an in-line valve, the valve may be provided along the already existing piping, without additional piping for accommodating the valve. Alternatively, or additionally, specific piping sections such as T-shaped piping sections may be omitted by providing an in-line valve.

The valve seat element 5 is fixed inside the valve body 1. The valve seat element 5 has a valve seat 7, a valve seat inlet 8 and a valve seat outlet 9. The valve element 4 is capable of allowing or obstruction flow of refrigerant through the valve 1 and the valve seat element 5 by the valve element 4 being displaced in relation to the valve seat 7. In the shown position of the valve element 4 in relation to the valve seat 7, flow of refrigerant through the valve is obstructed, and the valve element 4 is in a fully closed position.

The SMA element 10, in the embodiment shown in FIG. 2, comprises a first string 11 and a second string 12 extending in parallel. Both the first string 11 and the second string 12 extend from a distant end position P1, said distant end being distant from the valve element 4, and to a proximate end position P2, said proximate end being proximate to the valve element 4. The valve element 4 is made of a material, which is electrically insulating the SMA element 10 from other elements and parts of the valve.

The SMA element 10, in the embodiment shown in FIG. 1, is constituted by a single piece consisting of the first string 11, the second string 12 and an intermediate string 13 between the first string 11 and the second string 12. The first string 11 extends from the distant end P1 to proximate end P2 at the valve element 4, at which proximate end P2 the first string enters the valve element 4. Along the intermediate string 14 of the SMA element 10, between the first string 11 and the second string 12, the SMA element 10 is embedded in the valve element 4. The extension of the SMA element 10 changes direction from where the SMA element 10 enters the valve element 4 to where the SMA element 10 exits the valve element 12. The SMA element 10 exits the valve element 4 in a direction opposite to the direction of the SMA element 10, where the SMA element 10 enters the valve element 4. In the embodiment shown in FIG. 1, the SMA element 10 changes direction by 180 degrees, so that the first string 11 is parallel with the second string 12. Alternatively, the first string and the second string may form a mutual angle of up to 90 degrees and any other mutual angle between 90 degrees and 0 degrees, that is, any mutual angle between 90 degrees and parallel as shown in FIG. 2.

An encapsulation 14 is provided, in which the first string 11 and the second string 12 of the SMA element 10 are extending. In the embodiment shown, the encapsulation is an elongated body, such as a pipe or a tube or a rod, inside which the first string 11 and the second string 12 of the SMA element 10 are extending. If the encapsulation is an elongated body inside which the first string 11 and the second string 12 of the SMA element 10 are extending, the first string 11 and the second string 12 are capable of displacing within the encapsulation 14. The first string 11 and the second string 12 being capable of displacing within the encapsulation 14 is obtained by the encapsulation constituting a cover being one pipe or one tube or one rod having an elongated internal cavities for accommodating both the first string 11 and the second string 12 inside the elongated internal cavities. Alternatively, the encapsulation 14 constitutes a cover being a plurality of pipes or tubes or rods, each pipe or tube or rod having an elongated internal cavity (not shown) for accommodating one of the strings 11,12.

In an alternative embodiment, the encapsulation, in which the first string 11 and the second string 12 of the SMA element 10 are extending, is a coating or a cover provided on an outside surface of the first string 11 and the second string 12 of the SMA element 10. If the encapsulation is a coating or a cover on the outside surface of the first string 11 and the second string, the encapsulation is capable of displacing along with a displacement of the first string 11 and the second string 12.

If the encapsulation is a coating or a cover on the outside surface of the first string 11 and the second string 12, the coating or cover is made of a material having a thermal conductivity lower than a thermal conductivity of the SMA material. Possibly, a coating may be made of Polytetrafluoroethylene (PFTE).

The encapsulation 14 provides at least one of the following properties: a thermal resistance between the SMA element and the surroundings of the encapsulation, a thermal conductor between the SMA element and the surroundings of the encapsulation, an electrical resistance between the SMA element and elements of the valve surrounding the SMA element, an electrical resistance between a plurality of extensions of the SMA element.

A pipe 15, in which the encapsulation 14 extends, constitutes a cover for the encapsulation 14, and also constitutes a rigid element between the valve seat element 5 and the distant end P1 of the SMA element 10. The pipe 15 forms an integrate part of the valve body 1, but the pipe 15 is not part of the valve body 1 as such. The valve body comprises only the part of the valve enclosing the valve element 4 and the valve seat element 5. In the embodiment shown in FIG. 1, the valve body 1, the valve inlet 2, the valve outlet 3 and the pipe 15 is the one and same element. The valve inlet 2 is an integrate element of the valve body 1.

The encapsulation 14 is provided with distance elements 19 extending from an outside surface of the encapsulation 14. The distance elements 19 constitute elements for maintaining the encapsulation in distance from an inside surface of the pipe 15. The encapsulation is maintained inside the pipe 15 in such a manner that refrigerant flowing from the valve inlet 2 to the valve outlet 3 is capable of flowing past the encapsulation 14. The encapsulation 14 is this provided within a flow of refrigerant through the valve.

In the embodiment shown in FIG. 2, a measure 20 for monitoring a position of the valve element 4 in relation to the valve seat 7 is provided. The measure 20 has one end provided with a magnet 21, the position of which magnet 21 is recorded by an outside electronic or electric recording means 22. The measure 20 has another end fixed to the valve element 4. The other end is displaced together with the valve element 4, whenever the valve element 4 is displaced towards the fully closed position, as shown in FIG. 2, or away from the fully closed position. The outside recoding means 22 is capable of transmitting a signal of the position of the magnet 21, and thus of the valve element 4 in relation to the valve seat 7.

A stop 16 is provided at the distant end P1 of the SMA element 10, also being a distant end of the encapsulation 14. The stop 16 is fixed to the distant end P1 of the encapsulation 14 and constitutes a placeholder for wires 23. The stop 16 comprises two wires 23 constituting electrical connectors for the first string 11 and the second string 12 of the SMA element 10. The wires 23 extend to a seal 24 provided in an insert 25. The insert 25 is inserted into a bend section of the encapsulation 14 and into the pipe 15. The seal 25 is provided with two pins 17 constituting electrical connectors between the wires 23 and a circuit board 26. The circuit board 26 comprises electronics for controlling electrical current supplied to the SMA element 10. Amongst other parameters, supply of electrical current to the SMA element 10 is dependent on the position of the probe 21 and thus of the valve element 4. The recoding means 22 is also connected to the circuit board 26. A plug (not shown) of an electrical current supply (not shown) is intended for engaging with pins 27. Some of the pins 27 are intended for applying the electrical current to circuit board 26 and from the circuit board 26 further on to the SMA element 10. Other of the pins 27 are intended for transmitting, to a display device (not shown), the signal provided by the recording means 22 of the position of the probe 21.

An elastic element 18, preferably a helical spring, is provided inside the pipe 15, between the encapsulation 14 and the valve element 4. The elastic element 18 forces the valve element 4 towards the valve seat element 5. In the embodiment shown in FIG. 1, when the valve element 4 is forced towards the valve seat element 5, the valve element 4 is in a fully closed position in relation to the valve set 7. When the valve is to be open, compared to fully closed, the force from the elastic element 18 is counteracted by an oppositely directed force from the SMA element 10, when an electric current is applied to the SMA element 10.

The encapsulation 14 of the embodiment shown in FIG. 2 is fixed to the valve body 1 in such a manner, that refrigerant flowing through the valve does not come into direct contact with the SMA element 10. Thereby, the SMA element 10 will not be directly cooled by the refrigerant, and the intended properties of the SMA element is maintained unaffected by the refrigerant. The intended properties of the SMA element is heating of the SMA element, when electric current is applied to the SMA element, and the heating of the SMA element resulting in the SMA element changing shape. Changing shape of the SMA element will be an extension of a length of the first string 11 and the second string 12.

Figure 3:
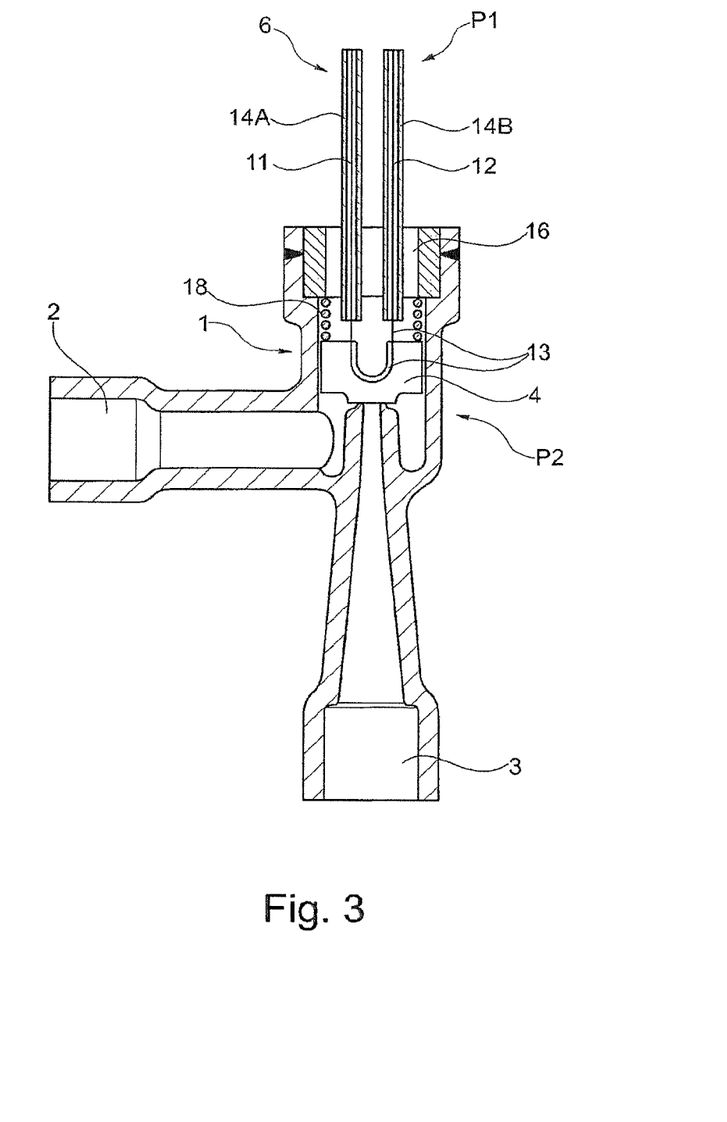
FIG. 3 is a third possible embodiment of a valve according to the invention.

FIG. 3 shows a third embodiment of a valve comprising a valve body 1, a valve inlet 2 and a valve outlet 3. The valve furthermore comprises a valve element 4 and an actuator 6 for operating the valve element 4 in relation to the valve seat element 5.

The valve body 1 has a valve seat 7. In the embodiment shown, the valve seat 7 constitutes an integrate part of the valve body 1. The valve element 4 is capable of allowing or obstruction flow of refrigerant through the valve 1 by the valve element 4 being displaced in relation to the valve seat 7. In the shown position of the valve element 4 in relation to the valve seat 7, flow of refrigerant through the valve is obstructed, and the valve element 4 is in a fully closed position. The outlet 3 of the valve 1 is diverging from the valve seat 7 and further along the extension of the outlet 3. A diverging outlet reduces the pressure of the refrigerant after having passed the valve seat. Reduction of the pressure reduces the risk of recirculation of the refrigerant and reduces the risk bubbles forming in the refrigerant. Reduction of the risk of bubbles forming reduces any noise, which may occur and may be disturbing, when the refrigerant passes the valve.

The actuator 6 comprises an elongated SMA element 10 made of SMA material, said element controlling a position of the valve element 4. In the remainder of the detailed description, SMA element will be denoted SMA element and SMA material will be denoted SMA material. An SMA element made of an SMA material, mostly a metal, is an element that "remembers" the original shape. The original shape of the SMA element is the shape, when not being subject to any combination of mechanical, thermal and/or electrical impact. The SMA material is possibly a nickel-titanium alloy. Other SMAs include copper-aluminum-nickel, copper-zinc-aluminum, and iron-manganese-silicon alloys.

The SMA element 10, in the embodiment shown in FIG. 3, comprises a first string 11 and a second string 12 extending in parallel. Both the first string 11 and the second string 12 extend from a distant end position P1, said distant end being distant from the valve element 4, and to a proximate end position P2, said proximate end being proximate to the valve element 4. The valve element 4 is made of a material, which is electrically insulating the SMA element 10 from other elements and parts of the valve.

The SMA element 10, in the embodiment shown in FIG. 3, is constituted by a single piece consisting of the first string 11, the second string 12 and an intermediate string 13 between the first string 11 and the second string 12. The first string 11 extends from the distant end P1 to proximate end P2 at the valve element 4, at which proximate end P2 the first string enters the valve element 4. Along the intermediate string 14 of the SMA element 10, between the first string 11 and the second string 12, the SMA element 10 is embedded in the valve element 4. The extension of the SMA element 10 changes direction from where the SMA element 10 enters the valve element 4 to where the SMA element 10 exits the valve element 12. The SMA element 10 exits the valve element 4 in a direction opposite to the direction of the SMA element 10, where the SMA element 10 enters the valve element 4. In the embodiment shown in FIG. 3, the SMA element 10 changes direction by 180 degrees, so that the first string 11 is parallel with the second string 12. Alternatively, the first string and the second string may form a mutual angle of up to 90 degrees and any other mutual angle between 90 degrees and 0 degrees, that is, any mutual angle between 90 degrees and parallel as shown in FIG. 3.

Encapsulations 14A and 14B constituting an elongated body are provided, in which the first string 11 and the second string 12 of the SMA element 10 are embedded, respectively. Although being embedded in the encapsulations 14A and 14B, the first string 11 and the second string 12 are capable of displacing within the encapsulations 14A and 14B. The first string 11 and the second string 12 being capable of displacing within the encapsulations 14A, 14B is obtained by the encapsulations 14A, 14B constituting the encapsulation 14 constituting a cover being a plurality of pipes or tubes or rods, each pipe or tube or rod having an elongated internal cavity (not shown) for accommodating one of the strings 11, 12. Alternatively, the encapsulation constitutes a cover being one pipe or one tube or one rod having a number of elongated internal cavities (not shown) for accommodating one of the strings 11, 12 inside the elongated internal cavities.

In an alternative embodiment, the encapsulation, in which the first string 11 and the second string 12 of the SMA element 10 are extending, is a coating or a cover provided on an outside surface of the first string 11 and the second string 12 of the SMA element 10. If the encapsulation is a coating or a cover on the outside surface of the first string 11 and the second string, the encapsulation is capable of displacing along with a displacement of the first string 11 and the second string 12.

If the encapsulation is a coating or a cover on the outside surface of the first string 11 and the second string 12, the coating or cover is made of a material having a thermal conductivity lower than a thermal conductivity of the SMA material. Possibly, a coating may be made of Polytetrafluoroethylene (PFTE).

The encapsulations 14A and 14B are provided with a major part of the encapsulation 14A and 14B extending outside the valve body 1. In the embodiment shown in FIG. 1, the valve body 1, the valve inlet 2, the valve outlet 3 and the valve seat 7 is the one and same element. The encapsulations 14A and 14B provides at least one of the following properties: a thermal resistance between the SMA element and the surroundings of the encapsulation, a thermal conductor between the SMA element and the surroundings of the encapsulation, an electrical resistance between the SMA element and elements of the valve surrounding the SMA element, an electrical resistance between a plurality of extensions of the SMA element.

A stop 16 is provided in the valve body 1. The stop 16 comprises part of the two encapsulations 14A and 14B. a distant end P1 of the encapsulations comprises electrical connectors for the first string 11 and the second string 12 of the SMA element 10. A plug (not shown) of an electrical current supply (not shown) for providing electrical current to the SMA element 10 is intended for engaging with connectors at the ends of the encapsulations 14A and 14B, for applying electrical current to the SMA element 10.

An elastic element 18, preferably a helical spring, is provided inside the pipe 15, between the stop 16 and the valve element 4. The elastic element 18 forces the valve element 4 towards the valve seat 7. In the embodiment shown in FIG. 3, when the valve element 4 is forced towards the valve seat 7, the valve element 4 is in a fully closed position in relation to the valve set 7. When the valve is to be open, compared to being fully closed, the force from the elastic element 18 is counteracted by an oppositely directed force from the SMA element 10, when an electric current is applied to the SMA element 10.

The encapsulations 14A and 14B of the embodiment shown in FIG. 3 is fixed to stop 16 in such a manner, that refrigerant flowing through the valve comes into direct contact with only a minor part of the SMA element 10. Thereby, the most part of the SMA element 10 will not be directly cooled by the refrigerant, and the intended properties of the SMA element is maintained unaffected by the refrigerant. The intended properties of the SMA element is heating of the SMA element, when electric current is applied to the SMA element, and the heating of the SMA element resulting in the SMA element changing shape. Changing shape of the SMA element will be an extension of a length of the first string 11 and the second string 12.

In the embodiment shown, the valve body is manufactured by Metal Injection Molding (MIM). Advantages of manufacturing the valve body by MIM, not only the embodiment shown in FIG. 3, but in general, for all embodiments as shown and as covered by the scope of the claims, has different advantages. MIM results in the capability of manufacturing the valve body in other materials than copper as normally used and result in the capability of manufacturing the valve body with small dimensions. In combination with an SMA actuator, in itself having small dimensions compared to other actuators normally used such as stepper motors, the overall design of the valve may be very small compared to valves manufactured by copper and with normally used actuators. Manufacturing the valve body in other material than copper also results in the valve being better suited, or being suited at all, for different refrigerants including ammonia.

In the embodiment shown in FIG. 3, the valve outlet has a frusto-conical shape, with the frustum at the start of the valve outlet. An advantage of a valve outlet having a frusto-conical shape is that noise from flow of the refrigerant is reduced. The valve shown in the figures is an expansion valve, and therefore, refrigerant flowing through the valve inlet will mainly be a liquid refrigerant, while refrigerant flowing through the valve outlet may be a mixture of liquid and gas. Refrigerant flowing through the valve outlet may exhibit back-flow of refrigerant from the valve outlet to the valve seat. Back-flow in the valve may result in noise being generated because of bubbles forming during the back-flow. By shaping the valve outlet with a frustu-conical shape, risk of such backflow, and thus the risk of noise being generated, is limited or even eliminated. Compared to other valves having other valve outlet shapes and having other actuators, the combination of the frusto-conical valve outlet and the SMA actuator, which in itself is noise-less, results in the overall noise level of the valve is limited, when refrigerant is flowing through the valve, and when the valve is operating, during which operation the SMA actuator opens and closes the valve element.

Figure 4:
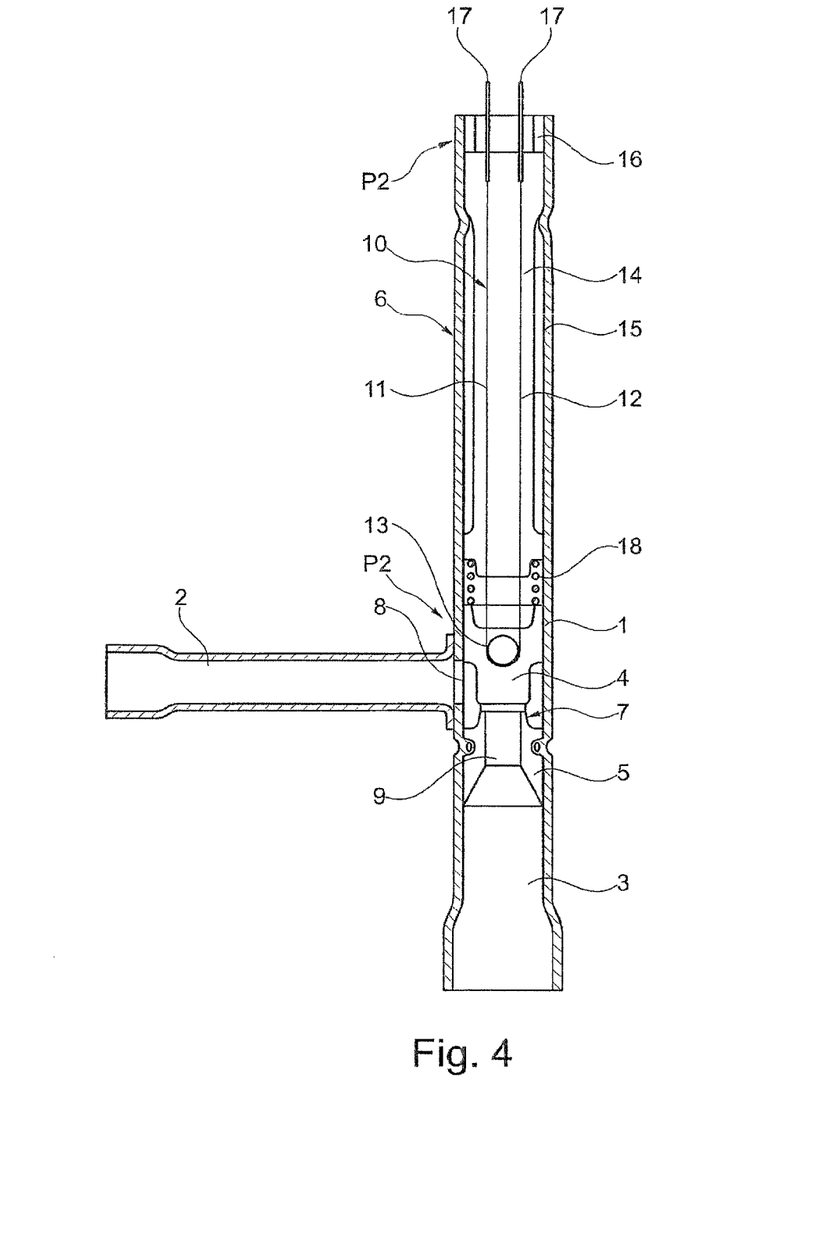
FIG. 4 is a fourth possible embodiment of a valve according to the invention.

FIG. 4 shows a fourth embodiment of a valve. The fourth embodiment shown in FIG. 4 is very similar to the first embodiment shown in FIG. 1. Accordingly, much of the description of the fourth embodiment is identical to the description of the first embodiment. The valve shown in FIG. 4 comprises a valve body 1, a valve inlet 2 and a valve outlet 3. The valve furthermore comprises a valve element 4 and a valve seat element 5 and an actuator 6 for operating the valve element 4 in relation to the valve seat element 5.

The valve seat element 5 is fixed inside the valve body 1. The valve seat element 5 has a valve seat 7, a valve seat inlet 8 and a valve seat outlet 9. The valve element 4 is capable of allowing or obstruction flow of refrigerant through the valve 1 and the valve seat element 5 by the valve element 4 being displaced in relation to the valve seat 7. In the shown position of the valve element 4 in relation to the valve seat 7, flow of refrigerant through the valve is allowed, and the valve element 4 is in a fully open position. The valve seat element 5 of the valve 1 is diverging from the valve seat 7 and further along the extension of the valve seat element 5. A diverging valve seat element 5 reduces the pressure of the refrigerant after having passed the valve seat. Reduction of the pressure reduces the risk of recirculation of the refrigerant and reduces the risk bubbles forming in the refrigerant. Reduction of the risk of bubbles forming reduces any noise, which may occur and may be disturbing, when the refrigerant passes the valve.

The actuator 6 comprises an elongated SMA element 10 made of SMA material, said element controlling a position of the valve element 4. In the remainder of the detailed description, SMA element will be denoted SMA element and SMA material will be denoted SMA material. An SMA element made of an SMA material, mostly a metal, is an element that "remembers" the original shape. The original shape of the SMA element is the shape, when not being subject to any combination of mechanical, thermal and/or electrical impact. The SMA material is possibly a nickel-titanium alloy. Other Shape Memory Alloys include copper-aluminum-nickel, copper-zinc-aluminum, and iron-manganese-silicon alloys.

The SMA element 10, in the embodiment shown in FIG. 4, comprises a first string 11 and a second string 12 extending in parallel. Both the first string 11 and the second string 12 extend from a distant end position P1, said distant end being distant from the valve element 4, and to a proximate end position P2, said proximate end being proximate to the valve element 4. The valve element 4 is made of a material, which is electrically insulating the SMA element 10 from other elements and parts of the valve.

The SMA element 10, in the embodiment shown in FIG. 4, is constituted by a single piece consisting of the first string 11, the second string 12 and an intermediate string 13 between the first string 11 and the second string 12. The first string 11 extends from the distant end P1 to proximate end P2 at the valve element 4, at which proximate end P2 the first string enters the valve element 4. Along the intermediate string 13 of the SMA element 10, between the first string 11 and the second string 12, the SMA element 10 is embedded in the valve element 4. The extension of the SMA element 10 changes direction from where the SMA element 10 enters the valve element 4 to where the SMA element 10 exits the valve element 12. The SMA element 10 exits the valve element 4 in a direction opposite to the direction of the SMA element 10, where the SMA element 10 enters the valve element 4. In the embodiment shown in FIG. 4, the SMA element 10 changes direction by 180 degrees, so that the first string 11 is parallel with the second string 12. Alternatively, the first string and the second string may form a mutual angle of up to 90 degrees and any other mutual angle between 90 degrees and 0 degrees, that is, any mutual angle between 90 degrees and parallel as shown in FIG. 4.

An encapsulation 14 constituting an elongated body is provided, in which the first string 11 and the second string 12 of the SMA element 10 are embedded. Although being embedded in the encapsulation 14, the first string 11 and the second string 12 are capable of displacing within the encapsulation 14. The first string 11 and the second string 12 being capable of displacing within the encapsulation 14 is obtained by the encapsulation constituting a cover being one pipe or one tube or one rod having a number of elongated internal cavities (not shown) for accommodating one of the strings 11, 12 inside the elongated internal cavities. Alternatively, the encapsulation 14 constitutes a cover being a plurality of pipes or tubes or rods, each pipe or tube or rod having an elongated internal cavity (not shown) for accommodating one of the strings 11,12.

In an alternative embodiment, the encapsulation, in which the first string 11 and the second string 12 of the SMA element 10 are extending, is a coating or a cover provided on an outside surface of the first string 11 and the second string 12 of the SMA element 10. If the encapsulation is a coating or a cover on the outside surface of the first string 11 and the second string, the encapsulation is capable of displacing along with a displacement of the first string 11 and the second string 12.

If the encapsulation is a coating or a cover on the outside surface of the first string 11 and the second string 12, the coating or cover is made of a material having a thermal conductivity lower than a thermal conductivity of the SMA material. Possibly, a coating may be made of Polytetrafluoroethylene (PFTE).

The encapsulation 14 provides at least one of the following properties: a thermal resistance between the SMA element and the surroundings of the encapsulation, a thermal conductor between the SMA element and the surroundings of the encapsulation, an electrical resistance between the SMA element and elements of the valve surrounding the SMA element, an electrical resistance between a plurality of extensions of the SMA element.

A pipe 15, in which the encapsulation 14 extends, constitutes a cover for the encapsulation 14, and also constitutes a rigid element between the valve seat element 5 and the distant end P1 of the SMA element 10. The pipe 15 forms an integrate part of the valve body 1, but the pipe 15 is not part of the valve body 1 as such. The valve body comprises only the part of the valve enclosing the valve element 4 and the valve seat element 5. In the embodiment shown in FIG. 4, the valve body 1, the valve outlet 3 and the pipe 15 is the one and same element. The valve inlet 2 is a separate element fixed to the valve body 1. In alternative embodiments, see FIG. 2 and FIG. 3, also the valve inlet 2 is integrated with the valve body 1.

A stop 16 is provided at the distant end P1 of the SMA element 10, also being a distant end of the encapsulation 14 and of the pipe 15. The stop 16 comprises two pins 17 constituting electrical connectors for the first string 11 and the second string 12 of the SMA element 10. A plug (not shown) of an electrical current supply (not shown) for providing electrical current to the SMA element 10 is intended for engaging with the pins 17 for applying electrical current to the SMA element 10. The stop 16 is fixed to the distant end P1 of the pipe 15 and constitutes a stop for the encapsulation 14 and also constitutes a placeholder for the pins 17.

An elastic element 18, preferably a helical spring, is provided inside the pipe 15, between the encapsulation 14 and the valve element 4. The elastic element 18 forces the valve element 4 towards the valve seat element 5. In the embodiment shown in FIG. 4, when the valve element 4 is forced towards the valve seat element 5, the valve element 4 is in a fully open position in relation to the valve set 7. When the valve is to be less open than fully open, the force from the elastic element 18 is counteracted by an oppositely directed force from the SMA element 10, when an electric current is applied to the SMA element 10.

The valve seat element 5 and the valve element 4 of the embodiment shown in FIG. 4 is fixed to the valve body 1 in such a manner, that refrigerant flowing through the valve does not come into direct contact with the SMA element 10. Thereby, the SMA element 10 will not be directly cooled by the refrigerant, and the intended properties of the SMA element is maintained unaffected by the refrigerant. The intended properties of the SMA element is heating of the SMA element, when electric current is applied to the SMA element, and the heating of the SMA element resulting in the SMA element changing shape. Changing shape of the SMA element will be an extension of a length of the first string 11 and the second string 12. In the embodiment shown in FIG. 4, the valve seat element 5 is provided so that refrigerant passing from the valve inlet 2 is passing the valve element 4, before passing the valve seat element 5. The valve seat inlet 8 has a size and/or shape cooperating with a size and/or shape of the valve element 4, in such a manner that a so-called balanced port is obtained, that is, a pressure difference between the valve inlet 2 and the valve outlet 3 does not influence operation of the valve. Thereby, the actuator 6 only has to be dimensioned so that the force acting on the valve element 4 by the elastic element 18 needs to be counteracted for opening the valve. As described with reference to FIG. 3, the elastic element 18 is maintaining the valve element 4 in a fully closed position, when no current is applied to the SMA element 10.

In the following, different advantages, occurring alone or in combination, will be described, and relating to at least one of the embodiments shown in FIG. 1, FIG. 2, FIG. 3 and FIG. 4 and to the actuator and/or the valve according to the invention as claimed.

The valve according to the invention may be constructed so that a hermetic design is obtained. The embodiments shown in FIG. 1 and FIG. 2 do not comprise sealing such as gaskets or O-rings for sealing surfaces between different parts of the valve. Risks of leakage of refrigerant from the valve or ingress of ambient air into the valve are thereby minimized. The embodiment shown in FIG. 3 may comprise sealing, but does not comprise sealing between moving elements. Risks of any sealing being worn are eliminated, and risks of leakage and ingress of ambient air are thereby minimized.

In the embodiments shown, two extensions in the shape of string constitute part of the SMA element. Thereby, the force obtained along the extension of the SMA element is doubled compared to only one string. If a multiple more than two extensions are provided, a corresponding multiple increase of force by the SMA element is obtained. Apart from increasing the force, or additional to increasing the force, the electrical current needed for a certain displacement of the valve element may be decreased.

SMA element for operating the valve element has different advantages. An SMA element does not incur noise when the SMA element is changing shape between one shape, where current is supplied to the SMA element, and another shape, where no current is supplied to the SMA element. No noise is an advantage in many applications, like refrigeration systems where people are present, such as in offices, in shops or in domestic residences.

An SMA element does not incur electromagnetic disturbance when current is supplied to the SMA element, which is an advantage in some applications, like in automotive applications. An SMA element has small dimensions compared to for example a stepper motor, and therefore, an SMA element is well suited for valves having small dimensions. Valve bodies manufactured by Metal Injection Molding (MIM) may be very small, and therefore, an SMA element is well suited for valve bodies manufactured by MIM.

An SMA element having at least two extensions between the distant position and the proximate position need not use the valve body for conducting electrical current to the SMA element. Thereby, no special requirements of the valve body are needed in respect of being able to conduct current. The valve body may be made from other materials than electrically conducting materials. Also, any electro-mechanical properties and parameters of the actuator and of an actuator of a valve are only dependent on the SMA element.

Furthermore, an SMA element having at least two extensions between the distant position and the proximate position may have ends both leading to the distant position. The end of the SMA element may be connected in different ways to a plug for supplying electrical current to the SMA element from an electrical source. The ends of the SMA element may be fixed to a glass seal of the valve, or the ends of the SMA element may be soldered or braced to a plug of the valve, or the ends of the SMA element may be inserted into sockets provided in the valve body. Preferably, the different ways of connecting the ends of the SMA element to a plug are done at the distant position.

The embodiments of the invention described above are provided by way of example only. The skilled person will be aware of many modifications, changes and substitutions that could be made without departing from the scope of the present invention. The claims of the present invention are intended to cover all such modifications, changes and substitutions as fall within the spirit and scope of the invention.

What is claimed is:

1. An actuator for a valve in a vapour compression system, the actuator comprising:
   an elongated Shape Memory Alloy element having a distal end configured to be distant to a valve element of the valve and a proximal end configured to be proximate to the valve element of the valve, the Shape Memory Alloy element extending from the distal end to the proximal end along at least two extensions of the Shape Memory Alloy element; and
   at least one encapsulation constituting an elongated body for encapsulating the at least two extensions of the Shape Memory Alloy element, the at least one encapsulation providing a thermal resistance between a temperature of the at least two extensions of the Shape Memory Alloy element and a temperature of an environment of the encapsulation and of the at least two extensions of the Shape Memory Alloy element;
   wherein the encapsulation extends from the distal end to the proximal end; and
   wherein the at least two extensions of the Shape Memory Alloy element are configured to displace within the encapsulation along a direction between the distal end and the proximal end; and
   wherein the encapsulation comprises one pipe or one tube or one rod having at least two elongated internal cavities, each of the at least two elongated internal cavities accommodating one of the at least two extensions of the Shape Memory Alloy.

2. The actuator according to claim 1, wherein the Shape Memory Alloy element is shaped as a plurality of extensions in straight lines, with at least a first one of the plurality of extensions and a second one of the plurality of extensions extending substantially parallel along a direction between the distal end and the proximal end.

3. The actuator according to claim 1, wherein the Shape Memory Alloy element is made in single piece, with an intermediate section connecting a first one of the at least two extensions and a second one of the at least two extensions, said intermediate section of the Shape Memory Alloy element being configured to be in connection with the valve element.

4. The actuator according to claim 1,
   wherein the distal end of the Shape Memory Alloy element is connected to a housing of the actuator;
   wherein the Shape Memory Alloy element is electrically insulated from the housing; and wherein the Shape Memory Alloy element extends between the distal end and the proximal end electrically insulated from the housing.

5. The actuator according to claim 1, further comprising an elastic element providing a force counteracting an oppositely directed force from the Shape Memory Alloy element generated when an electric current is applied to the Shape Memory Alloy element; wherein the elastic element is capable of transforming the at least two extensions of the Shape Memory Alloy element from one shape when an electric current is applied to the Shape Memory Alloy element, to another shape when no electric current is applied to the Shape Memory Alloy element.

6. The actuator according to claim 1, wherein the encapsulation maintains a spacing between the at least two extensions of the Shape Memory Alloy element.

7. The actuator according to claim 1, wherein the encapsulation maintains the at least two extensions of the Shape Memory Alloy element in parallel.

8. The actuator according to claim 1, wherein the encapsulation is provided with a distance element extending from an outside surface of the encapsulation, wherein the distance element is configured to space the encapsulation from a surface.

9. A valve for a vapour compression system, comprising:
   a valve body with at least one inlet and at least one outlet for a refrigerant;
   a valve element positioned inside the valve body; and
   an actuator according to claim 1;
   wherein said actuator extends between the at least one inlet and the at least one outlet of the valve body.

10. The valve according to claim 9, wherein the at least two extensions of the Shape Memory Alloy element are configured to displace within the encapsulation along a direction between the distal end and the proximal end.

11. The valve according to claim 9,
   wherein the Shape Memory Alloy element is shaped as a plurality of extensions arranged in a plurality of straight lines;
   wherein at least a first one and a second one of the plurality of extensions extend between the proximal end and the distal end;
   wherein an intermediate section of the Shape Memory Alloy element is arranged at the proximal end and is attached to the valve element; and
   wherein the first one and the second one of the plurality of extensions form a mutual angle in the range of 0 degrees up to 90 degrees, where the first one and the second one of the plurality of extensions extend in parallel when the mutual angle formed between the extensions is 0 degrees.

12. The valve according to claim 9, wherein at least a portion of the length of the at least two extensions of the Shape Memory Alloy element extends inside the valve body, and wherein at least 50% of the length of the at least two extensions of the Shape Memory Alloy element extends outside the valve body.

13. The valve according to claim 9, wherein the length of the at least two extensions of the Shape Memory Alloy element extends inside the valve body, and where a flow of refrigerant is capable of passing the extension of the actuator.

14. The valve according to claim 9, wherein the encapsulation encapsulates a part of the Shape Memory Alloy element extending outside the valve body, and also encapsulates at least a part of the Shape Memory Alloy element extending inside the valve body, said encapsulation providing at least one of the following properties: a thermal resistance between the Shape Memory Alloy element and the surroundings of the encapsulation, a thermal conductivity between the Shape Memory Alloy element and the surroundings of the encapsulation, an electrical resistance between the Shape Memory Alloy element and elements of the valve surrounding the Shape Memory Alloy element, or an electrical resistance between a plurality of extensions of the Shape Memory Alloy element.

15. The valve according to claim 9, wherein no part of the Shape Memory Alloy element is exposed to flow of refrigerant, when said refrigerant is flowing through the valve during operation of the valve.

16. The valve according to claim 9, further comprising an elastic element for forcing the valve element towards either a fully closed position or a fully open position, and where a force from the elastic element is counteracted by an oppositely directed force from the Shape Memory Alloy element when an electric current is applied to the Shape Memory Alloy element.

17. A vapor compression system comprising:
a refrigeration system or an air conditioning system or a heat pump system; and
at least one valve according to claim 9.

18. An actuator for a valve in a refrigeration system, the actuator comprising:
an elongated Shape Memory Alloy element having a distal end configured to be distant to a valve element of the valve and a proximal end configured to be proximate to the valve element of the valve, the Shape Memory Alloy element extending from the distal end to the proximal end, the distal end of the Shape Memory Alloy element being connected to a housing of the Shape Memory Alloy element, the Shape Memory Alloy element being electrically insulated from the housing;
an encapsulation that encapsulates at least a portion of the Shape Memory Alloy element; and
an elastic element disposed between the encapsulation and the valve element;
wherein the Shape Memory Alloy element comprises at least two extensions, and wherein the encapsulation comprises at least two pipes or two tubes or two rods, each of the at least two pipes or two tubes or two rods having an elongated internal cavity for accommodating one of the at least two extensions of the Shape Memory Alloy; and
wherein a thermal conductivity of the encapsulation is lower than a thermal conductivity of the Shape Memory Alloy element.

19. A valve for a vapour compression system, comprising:
a valve body with at least one inlet and at least one outlet;
a valve element positioned inside the valve body;
a stop positioned inside the valve body having a proximal side facing the valve element and a distal side facing away from the valve element; and
an actuator comprising:
a Shape Memory Alloy element having a distal end distant to the valve element and a proximal end proximate to the valve element, the Shape Memory Alloy element comprising at least a first extension and a second extension extending from the distal end to the proximal end;
a first encapsulation encapsulating the first extension of the Shape Memory Alloy element, the first encapsulation providing a thermal resistance between a temperature of the first extension of the Shape Memory Alloy element and a temperature of an environment of the first encapsulation; and
a second encapsulation encapsulating the second extension of the Shape Memory Alloy element, the second encapsulation providing a thermal resistance between a temperature of the second extension of the Shape Memory Alloy element and a temperature of an environment of the second encapsulation;
wherein the first and second encapsulations extend through the stop so that at least a first portion of the first encapsulation and a first portion of the second encapsulation extend beyond the distal side of the stop, and at least a second portion of the first encapsulation and a second portion of the second encapsulation extend beyond the proximal side of the stop;
wherein a thermal conductivity of the first encapsulation is lower than a thermal conductivity of the Shape Memory Alloy element; and
wherein a thermal conductivity of the second encapsulation is lower than the thermal conductivity of the Shape Memory Alloy element.

20. The valve according to claim 19, wherein the proximal end of the Shape Memory Alloy element is attached to the valve element.

21. The valve according to claim 20, further comprising an elastic element being positioned between the valve element and the stop.

22. The valve according to claim 19, wherein the first encapsulation and the second encapsulation extends from the distal end to the proximal end, encapsulating the first extension and second extension of the Shape Memory Alloy element, respectively, along the entire distance from the distal end to the proximal end, and wherein the first encapsulation and the second encapsulation are capable of displacing together with the elongated Shape Memory Alloy element, at least between the distal end and the proximal end.

23. The valve according to claim 22, wherein the first encapsulation and the second encapsulation each constitute a coating provided at an outside surface of each of the extensions, respectively, said coating being made of a material having an elastic module making the encapsulation capable of elastically displacing corresponding to a possible displacement of each of the extensions.

* * * * *

UNITED STATES PATENT AND TRADEMARK OFFICE
CERTIFICATE OF CORRECTION

PATENT NO. : 10,443,753 B2
APPLICATION NO. : 14/760852
DATED : October 15, 2019
INVENTOR(S) : Johan van Beek et al.

Page 1 of 1

It is certified that error appears in the above-identified patent and that said Letters Patent is hereby corrected as shown below:

On the Title Page

Item (56), page 2, Column 1, Foreign Patent Document "JP 51019368 A 1/1986" should read as -- JP 61019368 A 1/1986 --.

Item (56), page 2, Column 1, Foreign Patent Document "JP 108320171 A 12/1996" should read as -- JP H08320171 A 12/1996 --.

Signed and Sealed this
Fourth Day of February, 2020

Andrei Iancu
*Director of the United States Patent and Trademark Office*